| (12) | United States Patent | (10) Patent No.: US 12,407,592 B2 |
|---|---|---|
| | Foley et al. | (45) Date of Patent: Sep. 2, 2025 |

(54) R-PHY MAP ADVANCE TIME SELECTION

(71) Applicant: ARRIS Enterprises LLC, Suwanee, GA (US)

(72) Inventors: Stephen Andrew Foley, North Attleboro, MA (US); Arpad Jordan, Winchester (GB)

(73) Assignee: ARRIS Enterprises LLC, Suwanee, GA (US)

( * ) Notice: Subject to any disclaimer, the term of this patent is extended or adjusted under 35 U.S.C. 154(b) by 254 days.

(21) Appl. No.: 18/114,200

(22) Filed: Feb. 24, 2023

(65) Prior Publication Data

US 2023/0291670 A1    Sep. 14, 2023

Related U.S. Application Data

(60) Provisional application No. 63/313,600, filed on Feb. 24, 2022.

(51) Int. Cl.
*H04L 43/0852* (2022.01)
*H04L 7/02* (2006.01)
*H04L 12/28* (2006.01)

(52) U.S. Cl.
CPC ............ *H04L 43/0858* (2013.01); *H04L 7/02* (2013.01); *H04L 12/2801* (2013.01); *H04L 12/2861* (2013.01)

(58) Field of Classification Search
CPC ... H04L 43/0858; H04L 7/02; H04L 12/2801; H04L 12/2861
See application file for complete search history.

(56) References Cited

U.S. PATENT DOCUMENTS

| 11,469,938 | B1 * | 10/2022 | Bonen | H04L 47/12 |
|---|---|---|---|---|
| 2010/0002719 | A1 | 1/2010 | Sowinski | |
| 2011/0134935 | A1 * | 6/2011 | Campos | H04J 3/1647 370/431 |
| 2015/0295669 | A1 * | 10/2015 | Chapman | H04L 27/345 370/503 |
| 2017/0303273 | A1 | 10/2017 | Jin | |
| 2019/0140758 | A1 * | 5/2019 | Cotter | H04L 43/0811 |
| 2020/0186453 | A1 * | 6/2020 | Zhang | H04L 43/0817 |
| 2020/0195362 | A1 * | 6/2020 | Neugeboren | H04J 3/0661 |
| 2020/0245346 | A1 * | 7/2020 | Chapman | H04W 72/1268 |
| 2021/0160091 | A1 | 5/2021 | Foley | |
| 2021/0273958 | A1 * | 9/2021 | McLean | H04L 63/1433 |

OTHER PUBLICATIONS

International Search Report and Written Opinion RE: Application No. PCT/US2023/013885, dated May 2, 2023.

* cited by examiner

*Primary Examiner* — Brian J. Gillis
*Assistant Examiner* — Chhian (Amy) Ling
(74) *Attorney, Agent, or Firm* — Chernoff, Vilhauer, McClung & Stenzel, LLP

(57) ABSTRACT

Systems and methods for dynamically adjusting a MAP advance time for a MAP message sent from a CCAP core to an RPD, based on a comparison of at least one measured latency value against at least one threshold.

20 Claims, 3 Drawing Sheets

R-PHY MAP ADVANCE TIME SELECTION

CROSS REFERENCE TO RELATED APPLICATIONS

The present application claims priority to U.S. Provisional Application No. 63/313,600 filed Feb. 24, 2022, the content of which is incorporated herein by reference in its entirety.

BACKGROUND

The subject matter of this application generally relates to distributed access architectures of a hybrid CATV network, and more particularly to R-PHY (remote physical) architectures that distribute the functions of the Cable Modem Termination System into the network.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content terminates as RF signals over coaxial cables, but is transmitted over the bulk of the distance between the content provider and the subscriber using optical signals. Specifically, CATV networks include a head end at the content provider for receiving signals representing many channels of content, multiplexing them, and distributing them along a fiber-optic network to one or more nodes, each proximate a group of subscribers. The node then de-multiplexes the received optical signal and converts it to an RF signal so that it can be received by viewers. The system in a head end that provides the video channels to a subscriber typically comprises a plurality of EdgeQAM units operating on different frequency bands that are combined and multiplexed before being output onto the HFC network.

Historically, the head end also included a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the video delivery system (EdgeQAM) in a single platform called the Converged Cable Access Platform (CCAP).

As networks have expanded and head ends have therefore become increasingly congested with equipment, many content providers have recently used distributed architectures to spread the functionality of the CMTS/CCAP throughout the network. This distributed access architecture (DAA) keeps the cable data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is Remote PHY (R-PHY) distributed access architecture that relocates the physical layer (PHY) of a traditional CCAP by pushing it to the network's fiber nodes. Thus, while the core in the CCAP performs the higher layer MAC layer processing, the R-PHY device in the node converts the downstream data sent by the core from digital to analog to be transmitted on radio frequency, and converts the upstream RF data sent by cable modems from analog to digital format to be transmitted optically to the core.

Once the functionality of the CMTS/CCAP is divided between a Mac layer in, e.g. a CCAP core and various PHY devices throughout the network, however, synchronously coordinating the transmissions between the downstream cable modems and the CCAP core becomes much more difficult. Specifically, to reduce interference among upstream transmissions, the CCAP sends downstream scheduling messages informing each cable modem of upcoming transmission windows assigned to it, and these scheduling messages must be received a sufficient amount of time before such transmission windows. Ordinarily, a CCAP would be able to reliably calculate the transmission delay between when it sends such messages and the time a cable modem receives the messages because the conditions between the CCAP and modem typically do not change rapidly. Such rapid changes do exist in an R-PHY system, however. What is therefore desired are improved systems and methods in an R-PHY architecture for determining the delay between the time a MAP message is sent and the time it is received.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

For purposes of the disclosure and the claims, the following terms are defined to as to more easily understand the subject matter described and claimed:

Master Clock: a clock that sends timing information to a slave clock for that clock to synchronize its time to that of the master clock.

Slave Clock: a clock that receives timing information from a master clock to synchronize its time to that of the master clock.

Grandmaster Clock: a clock that only operates as a master clock and is the source of time to the packet network:

Boundary Clock: a clock operates as both a slave and a master by having one port in a slave state receiving time from a master clock, and one or more ports in a master state which disseminate timing information to slaves.

MAP messages: messages sent by the CCAP containing bandwidth allocation maps (MAP). The MAP contains information that indicates when a cable modem can transmit and for how long. The CCAP needs to send MAP messages ahead of time, so the cable modem will not miss the transmit opportunity.

MAP advance time: The amount of time that the CCAP sends the MAP messages ahead of the transmit opportunity of a cable modem.

DOCSIS tics: a unit of time expressed in units of mini-slots since CMTS initialization time, where a mini-slot is 6.25 μsec.

Figure 1A:
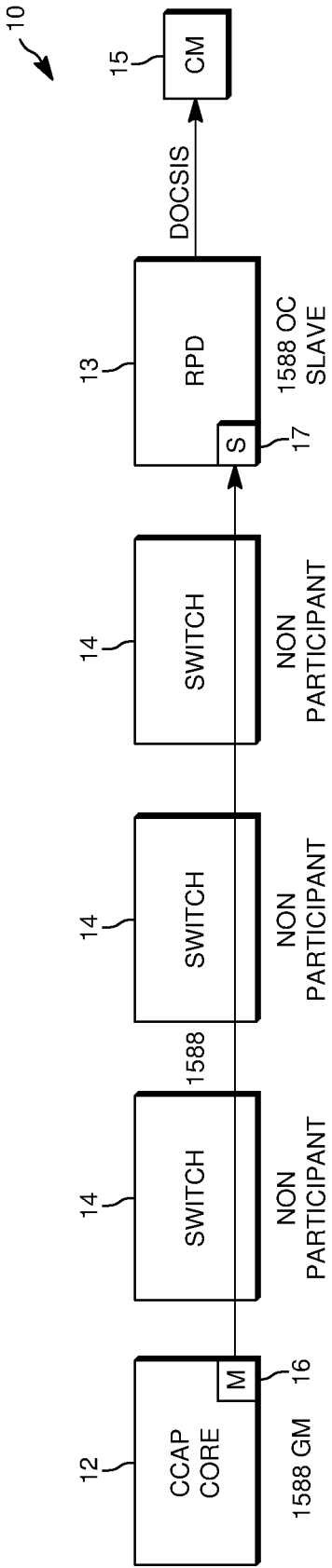
FIGS. 1A and 1B shows exemplary R-PHY architectures where a CCAP core is used to synchronously schedule transmissions to and from a plurality of cable modems.

As already noted, in R-PHY systems, the clocks of the Remote PHY Devices (RPDs) and the CCAP core must be synchronized in both phase and frequency to properly schedule data transfers between network components. FIG. 1A shows an exemplary topology 10 used to synchronize the devices in an R-PHY architecture. Topology 10 may include a CCAP core 12 synchronized with an RPD 13 connected together via a plurality of network switches 14. The RPD 13 is in turn connected to one or more cable modems 15. Synchronization is attained by a clock 16 in the core 12, acting as a grandmaster clock, which sends timing information to a slave clock 17 in the RPD 13. Those of ordinary skill in the art will appreciate that, although FIG. 1 shows only one RPD 13 connected to the core 12, many such RPDs may be simultaneously connected to the core 12, with each RPD having a slave clock 17 receiving timing information from the grandmaster clock 16 in the core. Those of ordinary skill in the art will also appreciate that an alternative timing architecture could include a separate grandmaster clock.

Figure 1B:
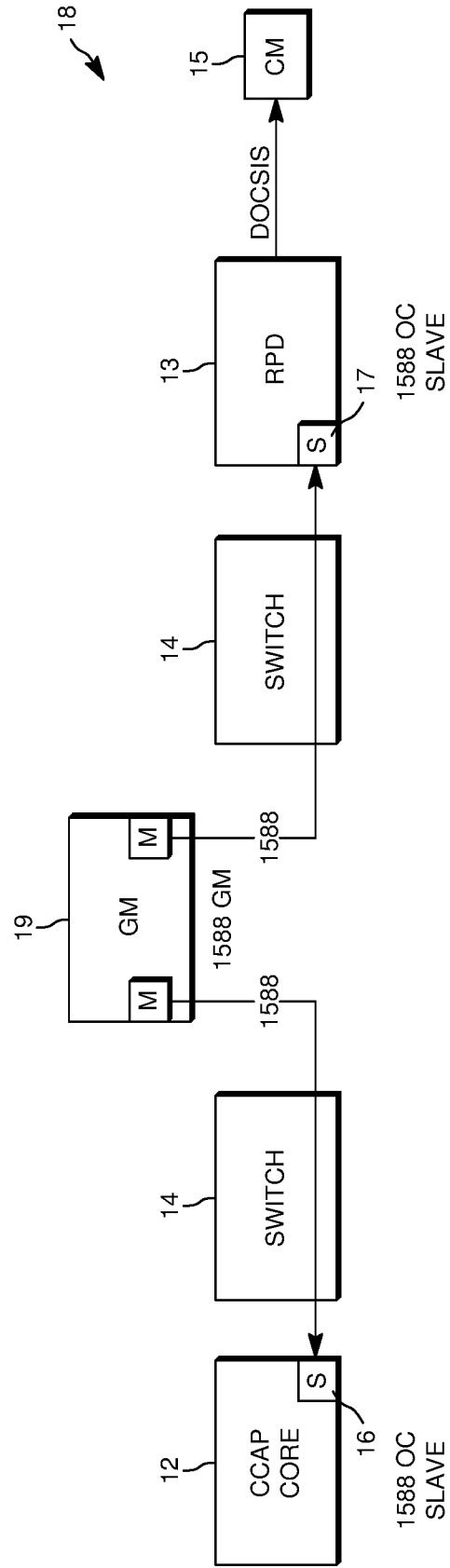

FIG. 1B shows an alternate topology 18, which differs from the topology 10 in that a separate grandmaster clock 19 is used to synchronize both the clock 16 in the core 12 and the clock 17 in the RPD 13. In this architecture, the clock 16 operates as a boundary clock where it is a slave to the grandmaster clock 19 but acts as a master clock to the slave clock 17 in the RPD 13.

Also as already noted, the CCAP core 12 operates as a MAC layer in an R-PHY system and is responsible for creating and sending periodic downstream MAP packets i.e., scheduling messages to the cable modems 15 so as to coordinate upstream transmissions among the network of cable modems 15. In turn, the cable modems 15 use the received MAP messages to determine when they may each gain access to the upstream channel and transmit packets in the upstream direction. These MAP messages must be received a sufficient amount of time before the transmission windows included in the MAP messages are scheduled to begin. Typically, the CMTS is configured with the maximum time needed for a MAP message to propagate through the HFC network to a cable modem, so that the CMTS can make sure it transmits MAPS early enough to be usable when it arrives at the cable modem. In legacy systems not based on an R-PHY architecture, a CCAP could reliably calculate the maximum transmission delay between when a MAP message is sent and when it will be received by a cable modem because the conditions between the CCAP and a cable modem are mostly known in advance.

In an R-PHY system, however, a variable latency is added in the transmission of a MAP message because the MAC layer and PHY layer of the CMTS are geographically separated by a packet switched network, and this latency often cannot be predicted by an operator. Thus, when the MAC layer prepares a bandwidth MAP and sends it to the PHY layer, it must determine the extra delay of traversing the packet switched network between the MAC and PHY layers when determining how early to send a Bandwidth MAP packet. Knowledge of the delay from the MAC layer to the PHY layer is crucial to the operation and performance of the system.

Figure 2:
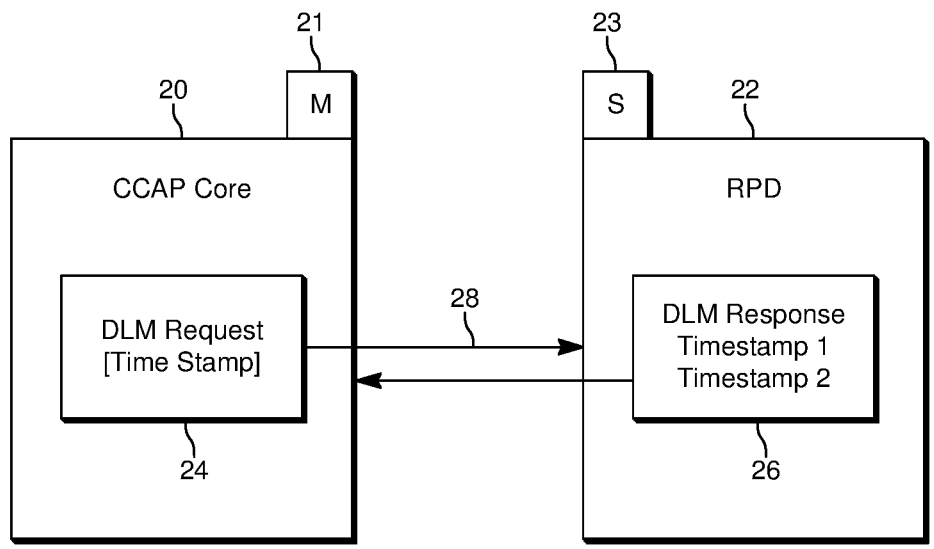
FIG. 2 shows one exemplary timing systems for determining a MAP advance time delay

FIG. 2 shows a method for determining an appropriate MAP advance time in an R-PHY system. In this method, a CCAP core 20 has a master clock 21 used to synchronize its time to that of a slave clock 23 in an RPD 22, ensuring that each of the core 20 and the RPD 22 are synchronized to the same DOCIS tics since CMTS initialization. Those of ordinary skill in the art will appreciate that the master clock 21 may be a grandmaster clock or may in turn be a boundary clock that is a slave to a separate grandmaster clock.

The CCAP core 20 may utilize a DEPI Latency Measurement (DLM) message exchange protocol, which uses Downstream External PHY Interface (DEPI) messages that serve to measure the latency between the CCAP Core 20 and RPD 22. Specifically, The CCAP Core 20 sends a DLM request message 24 to the RPD 22. Before transmitting the DLM request message 24 on the packet switched network, the CCAP Core 20 writes a timestamp in the packet, recording the CCAP Core transmit time of the packet. The units for this timestamp are preferably DOCSIS ticks. When the DLM request 24 arrives at the RPD 22, the RPD 22 records the time of packet arrival. The RPD 22 then forms a DLM response message 26, which contains the timestamp from the CCAP Core 22 and a timestamp representing the time of packet arrival at the RPD 22—both in units of DOCSIS ticks. The RPD 22 then transmits this DLM response to the CCAP Core, which then subtracts the CCAP Core timestamp from the RPD timestamp, and thereby get a resultant value which is the one-way latency 28 from the CCAP Core 20 to the RPD 22 in DOCSIS ticks. This time can be converted to units of seconds. Once the CCAP Core 20 has the latency measurement, it can make estimates of the other delays in the time it takes for the Bandwidth MAP packet to make it from the CCAP Core 20 to the cable modem, and use these estimates along with the measure of the latency from the CCAP Core 20 to the RPD 22 to determine the ideal time to transmit a Bandwidth MAP to have it arrive at a cable modem within tolerance.

The method shown in FIG. 2 may have several disadvantages. First, DLM requires extra dataplane messages to achieve its goal. Second, DLM requires extensive changes on the CCAP Core and RPD to be able to format and process DLM messages and handle message error scenarios. In addition, the CCAP Core needs to track periodically sent messages and outstanding messages. Third, a CCAP Core may be connected to hundreds of RPDs. Periodically sending a DLM request and processing a DLM response from potentially hundreds of RPDs may overwhelm the processing capability of the CCAP Core.

Figure 3:
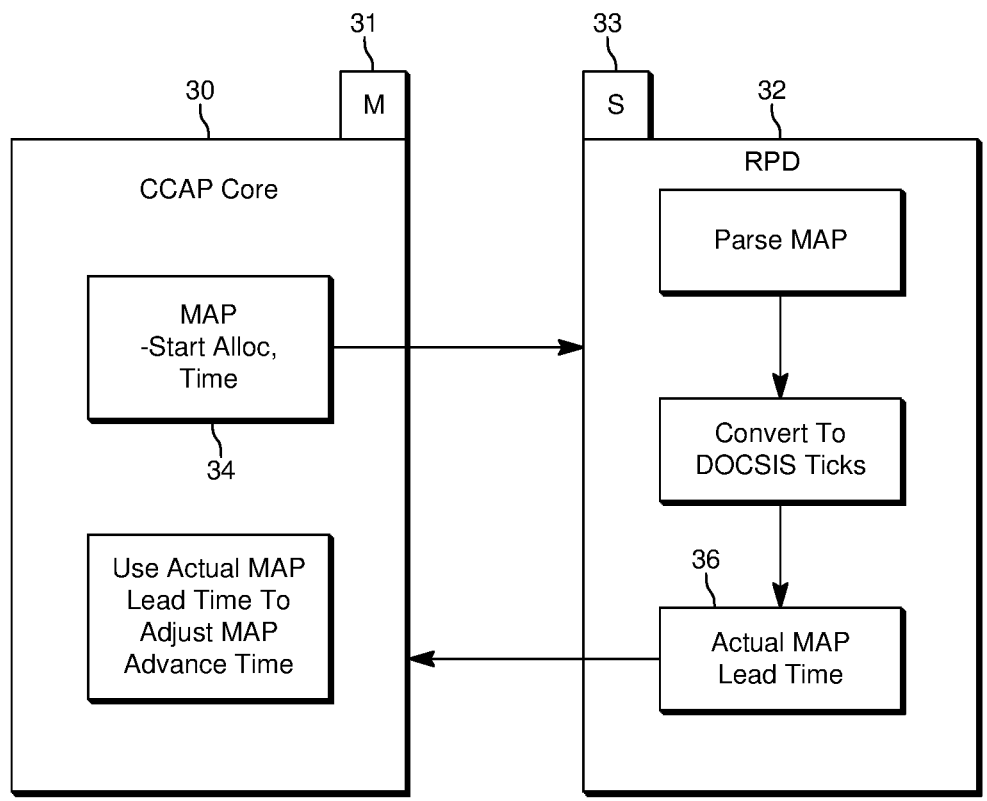
FIG. 3 shows an alternate timing system for determining a MAP advance time delay.

FIG. 3 shows an alternate system and method for determining an appropriate MAP advance time in an R-PHY system, which instead of exchanging separate messages devoted to measuring the packet delay from a CCAP core 30 to an RPD 32, uses data from the MAP messages themselves to estimate delay and adjust a MAP advance time accordingly. MAP messages include a MAP allocation start time, which is the start time of the temporal window for which the MAP allocates bandwidth. By examining the map allocation start time in a received MAP and comparing it to the time the RPD 32 receives the MAP message, an RPD 32 can determine the actual measured "HFC map lead time," which is the receipt time relative to the MAP allocation start time. The RPD 32 can record, store, and report this data as needed back to the CCAP core 30. When determining its MAP advance time, i.e. the time that the CCAP core 30 calculates that it should send a MAP message in advance of the window for which the MAP is applicable, the CCAP core 30 will have made certain assumptions about the latency between the MAC layer and PHY layer, and from those assumptions determine an expected HFC map lead time by which the RPD 32 will have been expected to receive the MAP. The MAC layer device can compare the measured HFC map lead time that is reported by the PHY layer device, to its own expected HFC map lead time. From this comparison the MAC layer can determine if its assumed latency is correct or not, and can adjust the assumed latency until the expected HFC map lead time matches the measured HFC map lead time.

Specifically, a system may include a CCAP core 30 with a master clock 31 connected via a packet switched network to an RPD 32 having a slave clock 33. The master clock 31 and the slave clock 33 ensure that each of the core 30 and the RPD 32 are synchronized to the same DOCIS tics since CMTS initialization. The CCAP core 30 may construct a MAP message 34 which includes a start time for the window that the MAP allocates bandwidth, recorded as a start_alloc_time_mini_slots. The MAP message is transmitted to the RPD 32, which would ordinarily pass the MAP message downstream onto its RF port. Prior to doing so, however, the RPD 23 parses the MAP message to retrieve the start_alloc_time_mini_slots, and records that value along with a time stamp for receipt of the MAP message, pkt_arrival_time_docsis_tick.

The start_alloc_time_mini_slots value in the Bandwidth MAP packet is expressed in units of mini-slots since CMTS initialization time. The RPD 32 preferably converts this time stamp into units of DOCSIS ticks since CMTS initialization. This can be done by looking at the "mini-slot size" associated with the MAP, which is configured on the RPD 32 by the CCAP Core 30 at RPD initialization. The configured mini-slot size parameter is the size of a single mini-slot in DOCSIS ticks. Thus, the start_alloc_time_mini_slots in the Bandwidth MAP packet is multiplied by the mini-slot size to give the resultant alloc start time expressed in DOCSIS ticks which is stored as map_alloc_start_time_docsis_tick. The RPD may also estimate the time it takes from recordation of the pkt_arrival_time_docsis_tick to the time that the Bandwidth MAP packet is actually transmitted downstream on its RF port. This estimate is fairly constant for the RPD 32, as the processing time for Bandwidth MAP packets does not vary much over time. This constant is also preferably expressed in units of DOCSIS ticks and may be denoted as est_processing_time_docsis_ticks.

A time expressed in units of DOCSIS ticks can be converted to seconds via multiplying by the constant seconds_per_docsis_tick, which is equal to 1/10240000. Thus, The RPD can create a message 36 comprising the time in seconds that the RPD 32 actually received the MAP message 34 in advance of the MAP start allocation time via the following formula:

hfc_map_lead_time_secs=(map_alloc_start_time_docsis_tick−(pkt_arrival_time_docsis_tick+est_processing_time_docs_tick))*seconds_per_docsis_tick.

The message 36 may then be sent to the CCAP core 30 which may use the measured MAP lead time to dynamically adjust its MAP advance time. In some embodiments, the CCAP core 30 may examine the recorded samples and determine if the measured HFC map lead time is within a tolerance threshold for a portion of the RF plant attached to the reporting RPD 32. If the HFC map lead time is out of tolerance, the CCAP Core 30 can take a number of actions, including but not limited to (i) alerting the operator via logging or other user interface; (ii) adjusting its internal algorithms for how early to transmit Bandwidth MAPs to the RPD for the purpose of bringing the HFC map lead time back into tolerance; and (iii) collecting and storing data for later analysis to allow for identifying network issues and debugging.

In some embodiments, the RPD 32 may examine a MAP packet periodically and record the HFC map lead time for these packets. Each HFC map lead time is recorded a sample in a database and stored on the RPD 32. The RPD 32 may in some embodiments store the most recent X samples for retrieval by the CCAP Core 30 or a cable operator. The RPD 32 may provide storage for a number of samples, because the latency of the network between the CCAP Core 30 and the RPD 32 can vary over time based on routing, congestion, and other factors.

In many cases it may not be desirable to frequently change the MAP advance time, as doing so requires processing resources, particularly based on only small changes in latency. Notably, however, some operators use networks that provide a normal path and a redundant path from the core to the RPD where the redundant path typically is longer, requiring a longer MAP advance time since a MAP advance time that is too short can result in data loss and modem deregistration. However, when using the shorter normal path, a lower MAP advance time helps to increase performance since a shorter MAP advance time leads to better user throughput and lower delays.

Disclosed are novel systems and methods that avoid excessive MAP advance time adjustments, and maintains user throughput while avoiding data loss. Specifically, the present specification discloses systems and methods that utilize a small number of discrete MAP advance time values, and switches between these values based upon a comparison of a measured latency metric against a threshold latency metric. In exemplary embodiment, there may be only two tiers of MAP advance time values and a single threshold latency metric. Other embodiments may employ more tiers of MAP advance time values, and more associated threshold latency metrics.

Figure 4:
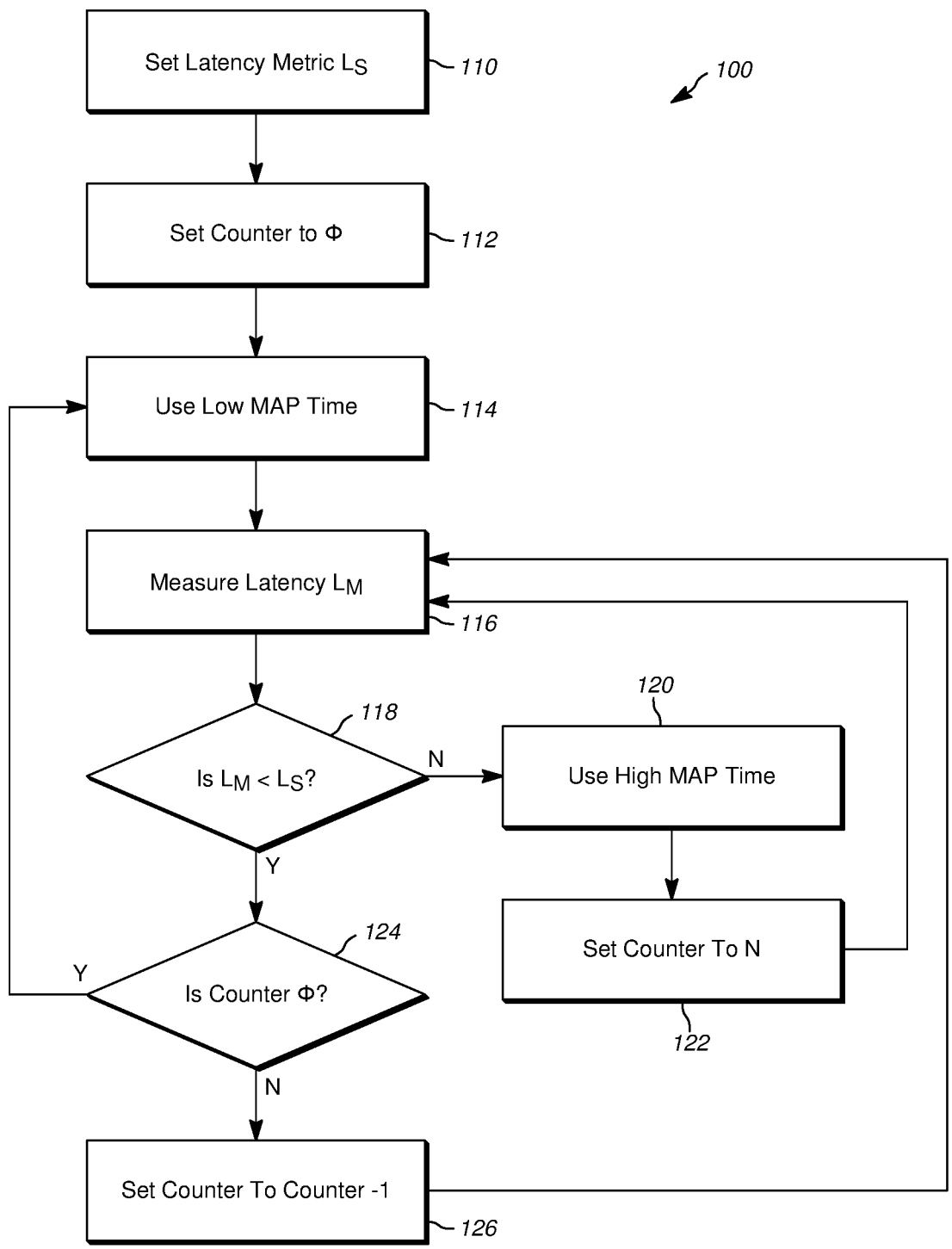
FIG. 4 shows an exemplary method according to one embodiment of the present disclosure.

FIG. 4 shows an exemplary method according to one embodiment of the disclosure. At step 110 a latency metric is selected and at step 112 a counter is set. At step 114 a low MAP advance time is adopted by a CCAP core, such as core 30 and is sent in a downstream MAP message. At step 116 one or more latency metrics Lm are obtained. The latency metric may be obtained in any appropriate manner. In one embodiment, for example, latency from a CCAP core to a remote device may be measured by the CCAP core using Downstream External PHY Interface (DEPI) latency measurements. In other embodiments, latency measurements may be calculated based on Precision Timing Protocol (PTP) message exchanges between a CCAP core and a remote device. These latency measurements may be computed by the CCAP core, or alternately may be computed by a remote device and sent to a CCAP core.

At step 118 the computed latency metric(s) may be compared to one or more thresholds $L_s$. If the latency metric is greater than the applicable threshold, then a higher MAP time is selected at step 120. In a preferred embodiment, at optional step 122, a counter is set from an initial value of zero to a value of "N." As explained below, this counter is used to ensure that the higher MAP value only decreases after a threshold number of measurements show diminished latency. Thus, in this specific preferred embodiment, a single instance of a latency measurement exceeding a threshold may cause the method to use a higher MAP advance time, but that higher MAP time is not reduced until a number of successive measurements indicate that doing so is warranted. This precaution adds robustness to the method so minimize the number of instances in which a MAP message is not received on time.

After the counter is set at step 122, a new latency measurement is obtained at step 116 and then again compared to a threshold at step 118. If the comparison shows that the measured latency is still higher than the threshold, then the higher MAP time is again selected, and the counter remains at the value "N." (Those of ordinary skill in the art will realize that, if more than two MAP times are used, necessitating a comparison to more than one threshold, then at step 120, the MAP time may be increased even further).

Returning to step 118, if the measured latency is less than the applicable threshold, then at step 124 it is determined whether the counter is zero. If it is not, then the counter is decremented by one, and the method returns to step 116 for a new latency measurement, and so forth. The foregoing procedures occur until the counter is decremented to zero, at which point the procedure reverts to step 114 where the MAP time decreases to the lower value.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method comprising:
    setting a plurality of predetermined Bandwidth Allocation Map (MAP) advance time values;
    measuring an amount of latency between a Converged Cable Access Platform (CCAP) core and a remote device transmitting in an upstream direction;
    selecting one of the plurality of predetermined MAP advance time values based upon the measured amount of latency; and
    sending a reservation MAP to the remote device having the identified MAP advance time.

2. The method of claim 1 including the step of comparing the measured amount of latency to at least one threshold.

3. The method of claim 2 where the number of thresholds is one fewer than the number of the plurality of predetermined MAP advance time values.

4. The method of claim 1 including the step of modifying a value of a counter based on a comparison of the measured latency to a threshold.

5. The method of claim 4 where the counter is either increased or decreased based on whether the measured latency exceeds or does not exceed the threshold.

6. The method of claim 4 where the counter is decremented when the counter is greater than one and the measured latency is not greater than the threshold.

7. The method of claim 1 where the number of the plurality of predetermined MAP advance times is two.

8. The method of claim 1 where the number of the plurality of predetermined MAP advance times greater than two.

9. The method of claim 1 where a higher-value predetermined MAP time is selected when a signal instance of the measured latency value exceeds a threshold.

10. The method of claim 9 where a lower-value predetermined MAP time is selected after a determination that a plurality of consecutively-measured latency values have not exceeded the threshold.

11. A Converged Cable Access Platform (CCAP) core configured to:
    communicate with a remote device in a communications network; and
    determine a latency associated with the transmission of a Bandwidth Allocation Map (MAP) message to the remote device and use the determined latency to select from among a plurality of predetermined MAP advance time values to communicate in the MAP message.

12. The CCAP core of claim 11 configured to compare the determined latency to at least one threshold.

13. The CCAP core of claim 12 where the number of thresholds is one fewer than the number of the plurality of predetermined MAP advance time values.

14. The CCAP core of claim 12 configured to modify a value of a counter based on the comparison.

15. The CCAP core of claim 14 where the counter is either increased or decreased based on whether the determined latency exceeds or does not exceed one or more of the at least one threshold.

16. The CCAP core of claim 14 configured to decrement the counter when the counter is greater than one and the determined latency is not greater than one or more of the at least one threshold.

17. The CCAP core of claim 11 where the number of the plurality of predetermined MAP advance times is two.

18. The CCAP core of claim 11 where the number of the plurality of predetermined MAP advance times greater than two.

19. The CCAP core of claim 11 configured to select a higher-value predetermined MAP time when a signal instance of the determined latency value exceeds one or more of the at least one threshold.

20. The CCAP core of claim 19 configured to select a lower-value predetermined MAP time after a determination that a plurality of consecutively-measured latency values have not exceeded one or more of the at least one threshold.

\* \* \* \* \*